US006026433A

United States Patent [19]

D'Arlach et al.

[11] Patent Number: 6,026,433

[45] Date of Patent: *Feb. 15, 2000

[54] METHOD OF CREATING AND EDITING A WEB SITE IN A CLIENT-SERVER ENVIRONMENT USING CUSTOMIZABLE WEB SITE TEMPLATES

[75] Inventors: Carmen Ximena D'Arlach, San Francisco; Stephen Kenneth Kershner, Palo Alto; Sameer Satyendra Singh, San Jose, all of Calif.

[73] Assignee: Silicon Graphics, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/819,598

[22] Filed: Mar. 17, 1997

[51] Int. Cl.[7] ........................................... G06F 13/00
[52] U.S. Cl. .................... 709/217; 709/203; 709/217; 709/219; 709/200; 707/10; 710/200
[58] Field of Search ..................................... 707/513, 501, 707/506, 104, 10, 9, 4; 709/203, 206, 231, 227, 230, 218, 219; 710/200

[56] References Cited

U.S. PATENT DOCUMENTS

| | | | |
|---|---|---|---|
| 5,537,546 | 7/1996 | Sauter | 709/230 |
| 5,649,186 | 7/1997 | Ferguson | 707/10 |
| 5,708,825 | 1/1998 | Sotomayor | 707/501 |
| 5,734,909 | 3/1998 | Bennett | 709/229 |
| 5,737,536 | 4/1998 | Hermann et al. | 709/229 |
| 5,740,370 | 4/1998 | Battersby et al. | 709/219 |
| 5,742,768 | 4/1998 | Gennaro et al. | 395/200.33 |
| 5,761,673 | 6/1998 | Bookman et al. | 707/104 |
| 5,774,670 | 6/1998 | Montulli | 395/200.57 |
| 5,781,739 | 7/1998 | Bach et al. | 395/200.57 |
| 5,802,518 | 9/1998 | Karaev et al. | 707/9 |
| 5,802,530 | 9/1998 | Van Hoff | 707/513 |
| 5,835,712 | 11/1998 | DuFresne | 709/219 |
| 5,870,737 | 11/1998 | Dockter et al. | 707/4 |
| 5,918,010 | 6/1999 | Appleman et al. | 709/203 |

OTHER PUBLICATIONS

Kerry A. Lehto and W. Brett Polonsky, Introducing Microsoft FrontPage97, Microsoft Press, Dec. 1996.
Arturo Crespo & Eric A. Bier., Webwriter: A Browser Editor for Constructing Web Applications., Computer Networks and ISDN Systems, Sep. 28, 1996.

*Primary Examiner*—Frank J. Asta
*Assistant Examiner*—William C. Vaughn, Jr.
*Attorney, Agent, or Firm*—Wagner, Murabito & Hao LLP

[57] ABSTRACT

A method for creating and editing a Web site in a client-server computer network using customizable templates is provided. To create a Web site, the present embodiment first stores a plurality of templates in a storage device coupled to the client-server computer network. When a client computer generates a request to create a new Web site, the server computer transmits a list of templates to the client for display. The templates contain a multitude of editable objects or elements. A template is then selected upon which the new Web site will be based on. The new site is then customized according to a user's preference by editing the objects or elements. The customized site is then published as a new Web site. To edit a Web site, a client computer generates a request to edit a Web site and passes the request on to the server computer. The server computer transmits the Web site to the client for display. The Web site contains a multitude of editable objects or elements. The elements of the Web site are then customized according to a user's preference. The Web site with the customized elements is then published as a Web site.

18 Claims, 15 Drawing Sheets

METHOD OF CREATING AND EDITING A WEB SITE IN A CLIENT-SERVER ENVIRONMENT USING CUSTOMIZABLE WEB SITE TEMPLATES

BACKGROUND OF THE INVENTION (1) Field of the Invention

The present invention relates to the field of client-server network environments such as the World Wide Web or private "Intranets," and more particularly relates to creating and maintaining a Web site in such environments.

(2) Background Art

In the so-called information age, information that used to take weeks to search and retrieve is now available contemporaneously at our fingertips. The proliferation of client-server networks such as the Internet, and in particular the Word Wide Web ("Web"), makes a large amount of information accessible to anyone connected to the Internet. Intranets, which are essentially smaller, private versions of the Web, are also proliferating rapidly as companies strive to streamline their information processing.

In general, the layout language for a Web document is Hypertext Markup Language (HTML). Each Web document is given a "Uniform Resource Locator" (URL) which is essentially an address path identifying the server which hosts the desired document plus the location of the document on the server. Using a browser software such as Netscape™ Navigator, an end-user can send a request from a client computer to access a document stored at a particular URL on a server. When the server receives the user's request, it sends the requested HTML Web document to the client where the document can be displayed. The communications protocol used in making such a request and in transferring Web documents is the "Hypertext Transfer Protocol" (HTTP). For more information about the Web, see for example, T. Berners-Lee, R. Cailliau, A. Loutonen, H. F. Nielsen, and A. Secret, "The World Wide Web," Communications of the ACM, vol. 37(8), August 1994.

HTML allows any Web document to include hypertext "links" to other Web documents including graphical images. The effect of a hypertext link, is well known by practitioners of the art, is that when the document containing the link is displayed to an end-user at a client computer, the end-user can access the linked document by pointing and selecting a corresponding icon or highlighted text in the displayed document. The Web and Intranets allow not only information access, but also information publishing. To publish information, a Web site is typically created to associate HTML documents and files, which contain information for publishing. Users then access information in the form of the HTML documents and files by accessing the Web site and its hypertextual links.

Originally, Web sites were created by writing HTML text files, line by line. Then, HTML editors were created and eased some of the drudgery of writing HTML files. In both cases however, Web sites incorporating graphics and clickable icons were laborious to create because the graphics images had to be prepared in advance by graphics editing software. Consequently, users with little background in these arcane fields usually turned to graphics artists and Webmasters to create their Web sites. Hence, creating Web sites, especially graphics Web sites, has been a challenging task for most users.

Moreover, once a Web site has been created, it typically needs to be maintained and updated. This is because information is dynamic: it changes as new information becomes available. As in creating a Web site, maintaining or editing a Web site has not been a simple process of adding, deleting, and modifying information. The task of maintaining a Web site was usually relegated to a specially trained Web site administrator, also known as a Webmaster. Hence, maintaining a Web site has been an expensive, time-consuming, and labor intensive task.

Further complicating matters relate to the basic hardware configuration for the Web and Intranet, which typically exists in a client-server computer environment. In a typical client-server computer environment, the Web site is created and stored in the server. A typical user in a remote client computer cannot create a Web site to be stored in the server. The client may only access the Web site in the server by using a Web browser such as Netscape™ Navigator. Further, it is difficult for the typical user in a client computer to maintain a Web site stored in the server. Hence, a user with remote access to the server doesn't enjoy the benefit of being able to create and maintain a Web site.

Thus, what is needed is a method for easily and efficiently creating and maintaining a Web site without requiring knowledge of HTML in a client-server environment. What is further needed is a method that allows authoring a Web site from a client computer. The present invention provides a solution to these problems by implementing a user-friendly template-based system for creating and editing Web sites.

SUMMARY OF THE INVENTION

The present invention provides a computer-implemented method for easily and efficiently creating and editing a Web site without requiring knowledge of HTML in a client-server environment. Further, the present invention provides a method that allows authoring a Web site from a client computer based on a user-friendly template-based system for creating and editing Web sites.

The present embodiment provides a method for creating a Web site in a client-server computer network using customizable templates. The present embodiment first stores a plurality of templates in a storage device coupled to the client-server computer network. When a client computer generates a request to create a new Web site, the server computer transmits a list of templates to the client for display. The templates contain a multitude of editable objects or elements. A template is then selected upon which the new Web site will be based on. The new site is then customized according to a user's preference by editing the objects or elements. The customized site is then published as a new Web site.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances, well known methods, procedures, components, and circuits have not been described in detail as not to unnecessarily obscure aspects of the present invention.

Figure 1:
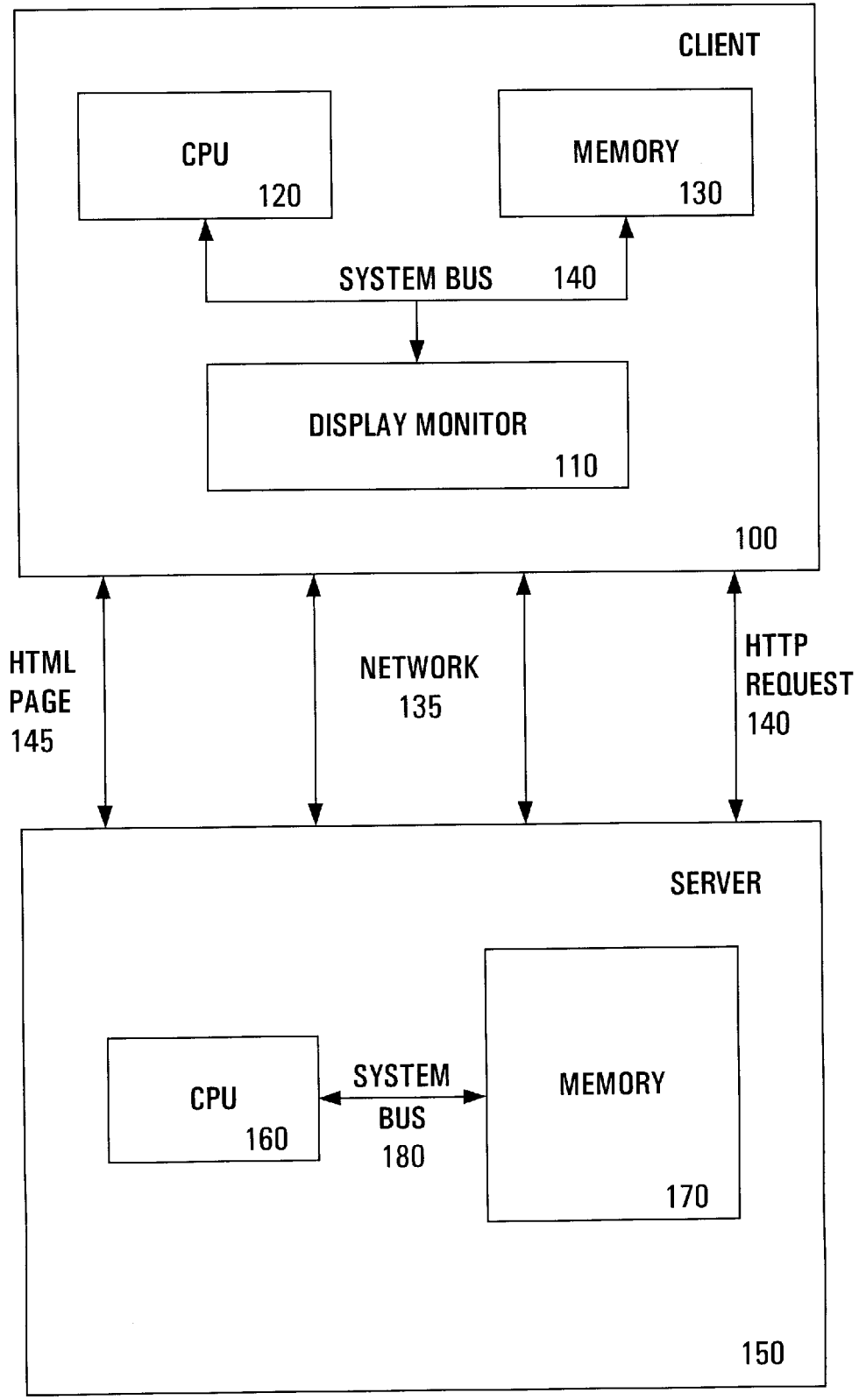
FIG. 1 illustrates a high level architectural view of a Web connection between a client computer and a server computer

Reference is made to FIG. 1 illustrating a high level architectural view of a Web connection between a client computer and a server computer. In FIG. 1, a client computer 100 consists of a CPU 120, a memory 130, and a display monitor 110 which are connected together by a system bus 137. Memory 130 stores browser software to communicate to server computer 150. It will be understood by a person of ordinary skill in the art that client computer 100 can also include other elements not shown in FIG. 1 such as disk drives, keyboard, and etc. A server computer 150, on the other hand, includes a CPU 160 and a memory 170 which are connected together by a system bus 180. Memory stores HTTP server software as well as a set of programs implemented in the present invention. A person of ordinary skill in the art will understand that memories 130 and 170 may also contain additional information such as applications programs, network communication programs (e.g., TCP/IP protocol), operating system software, data, and etc. Client computer 100 and server computer 150 are linked together by a network 135.

In an exemplary exchange, an end-user uses client computer 100 to execute a browser program stored in memory 130 to request, retrieve, and display network documents such as Web pages. Each request by client computer 100 for retrieval of a network document is formulated in accordance with the network protocol (e.g., HTTP) and transmitted across network 135 to server computer 150. Server computer 150 receives HTTP requests such as request 140 and processes them using the HTTP server software (e.g., standard network server software) stored in memory 170. The HTTP server software of server computer 150 then instructs CPU 160 to retrieve HTML page 145 from data stored in memory 170 and to transmit a copy of HTML Web page 145 back to client computer 100 for display on monitor 110.

Figure 2:
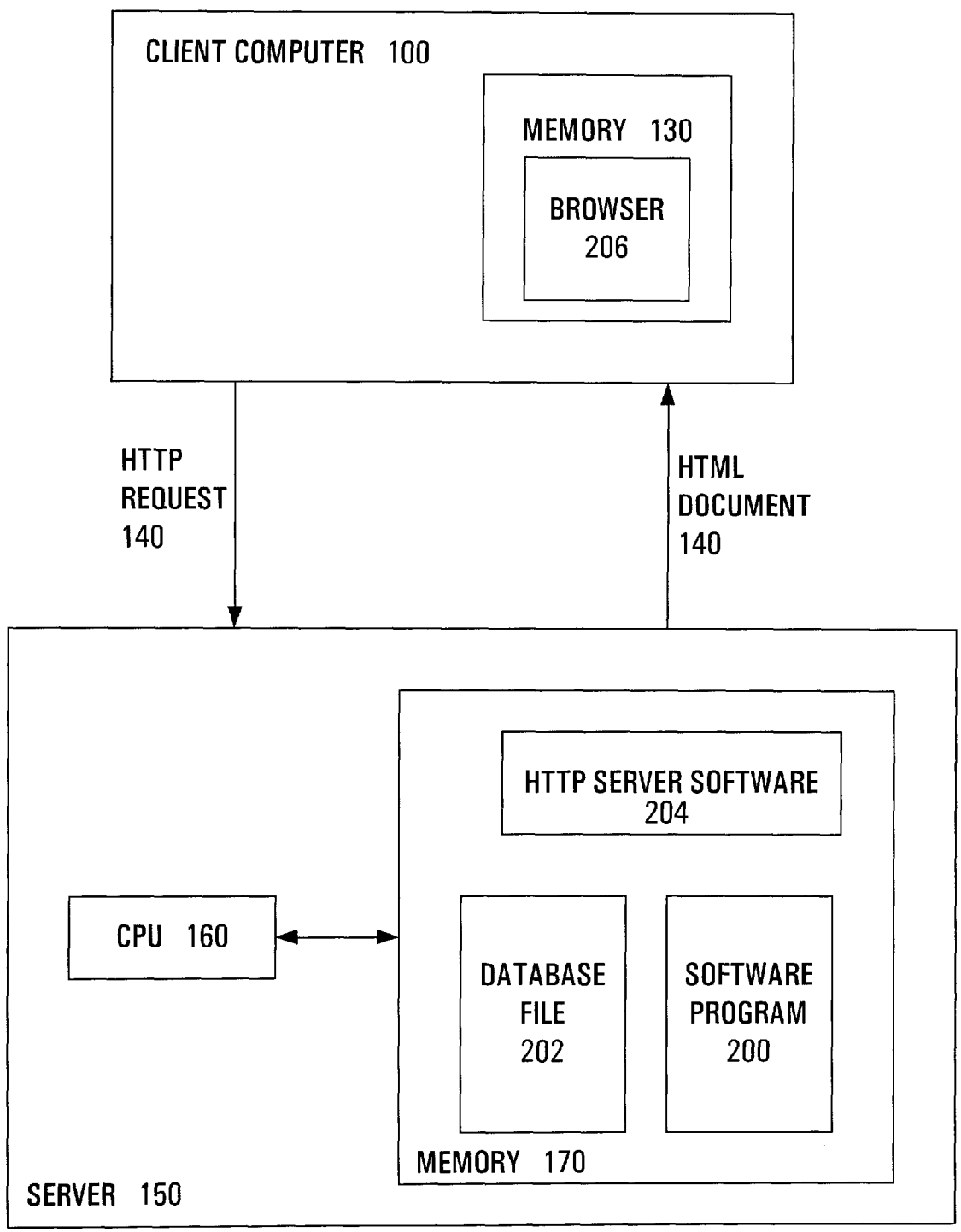
FIG. 2 illustrates a high level architectural view of the present invention relative to the Web connection between client computer and server.

FIG. 2 illustrates a high level architectural view of the present embodiment of the invention relative to the Web connection between client computer 100 and server 150 as shown in FIG. 1. In particular, FIG. 2 illustrates modules of software program to dynamically generate and maintain Web sites in accordance to the present invention. The database file 202 contains style templates used in the present invention. The software program 200, preferably a Common Gateway Interface (CGI) program, resides in the server computer and processes data submitted from a client. After processing the data, CGI program returns, on the fly, newly processed or updated information, such as a new HTML document, to the server which sends the new information to the Web browser to be displayed on the client computer. It should be clear to a person of ordinary skill in the art that the above software modules such as CGI program are well known in the art and can easily be written and/or modified to implement any Web creation and maintenance methods.

Figure 3:
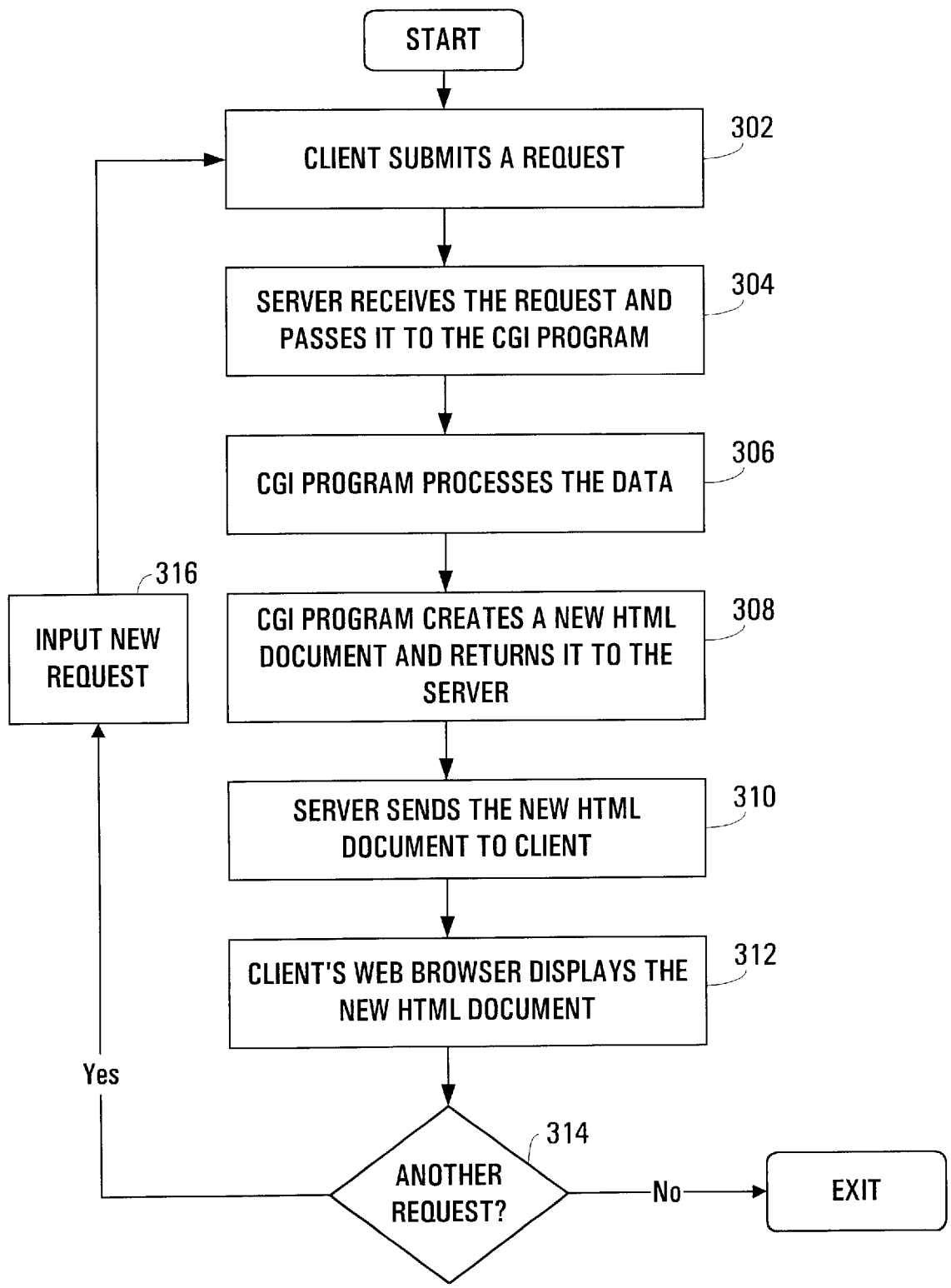
FIG. 3 illustrates a flow diagram of a basic interaction between a server and a client in a preferred embodiment of the present invention.

FIG. 3 illustrates a flow diagram of a basic interaction between a server and a client in a preferred embodiment for the present invention. At step 302, a user at a client computer submits a request to the server for a specified action. The server, at step 304, receives the request and passes it on to a software program, preferably a CGI program. At step 306, the CGI program processes the data related to the request. Then at step 308, the CGI program dynamically generates a new HTML document and returns it to the server. At step 310, the server sends the new HTML document to the client. The client, at step 312, then displays the HTML document for the user by using a browser program such as Netscape™ Navigator. At step 314, the user may have more requests to make. In that case, the user inputs new request as in steps 316 and 302. Otherwise, the process terminates as in step 318. It should be appreciated that the steps diagrammed in FIG. 3 represent how a server and client interact to process a request from a user. Hence, it should be recognized that these steps are carried out each time a user makes a request, starting from a user request to the display of a response on the client computer. In general, except where otherwise noted, the discussion herein applies equally to the Web and to Web-like Intranets.

CREATING AND EDITING A WEB SITE

According to the present embodiment, a Web site is created and edited based on a pre-built style template. In general, creating a Web site means creating a home page and a multitude of other pages for an entity or a person. These pages within the Web site are hypertextually linked.

The present embodiment provides and utilizes Web site style templates to enable users to create and maintain a Web site easily and efficiently. A style template contains customizable objects or elements: buttons (i.e., graphics), text labels, and other elements. Each element in turn has attributes or properties associated with it. For instance, a button or graphic element has the properties of a text field, a graphic, and a link. A text label element has text field and link properties associated with it.

Figure 4:
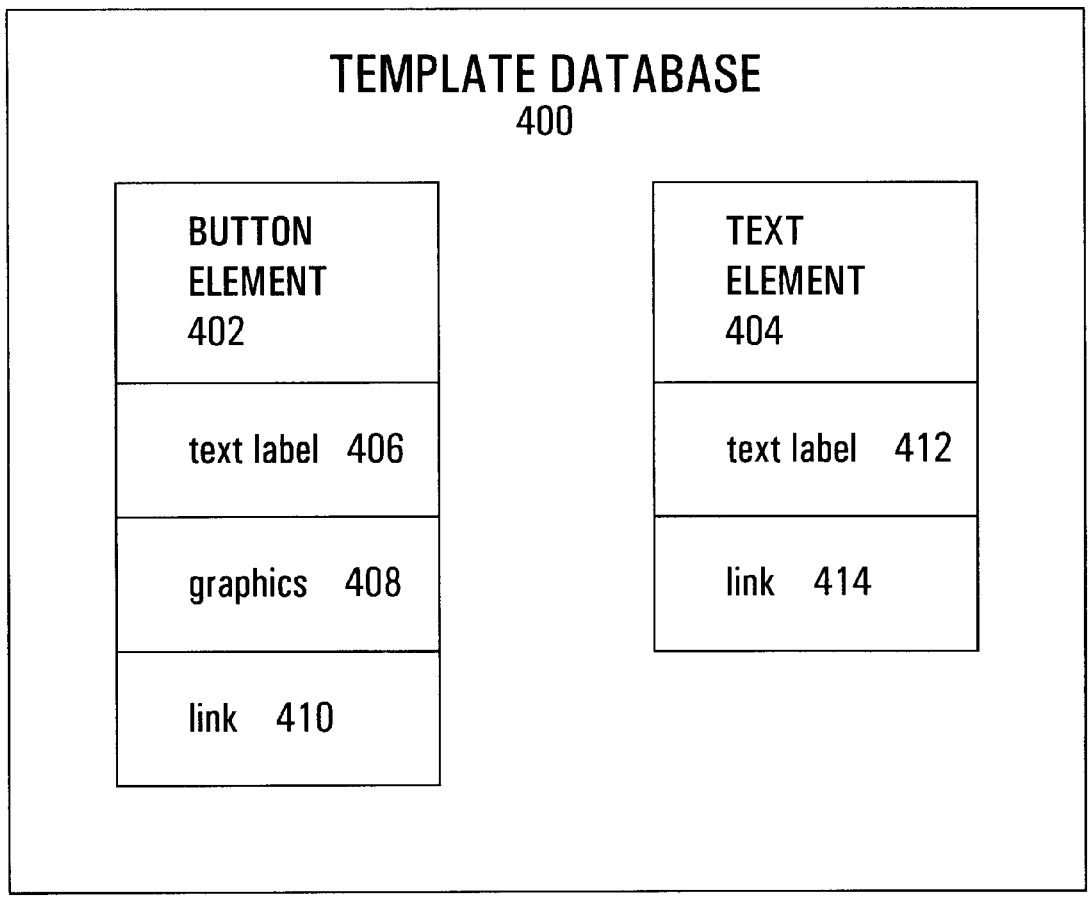
FIG. 4 illustrates a simplified database structure of an exemplary template database 400 according to the present embodiment.

FIG. 4 illustrates a simplified database structure of an exemplary template database 400 according to the present embodiment. Template database 400 contains customizable objects or elements: a button element 402 and a text element 404. Each element in turn has properties (i.e., attributes) associated with it. A button or graphic element 402 has the properties of text labels 406, graphics 408, and link 410. A text element 404 has text label 412 and link 414 properties associated with it. Although the present embodiment is illustrated by these elements and properties (i.e., attributes), those skilled in the art will no doubt recognize that the present embodiment can be practiced with additional and/or other elements and attributes as well.

According to the present embodiment, style templates are stored in the server computer as database files and consist of a set of objects or elements stored in the database. To allow creating a new Web site, a CGI program first makes a copy of an existing template in the server computer. The user then customizes or edits the working copy of the template, which is the user's site, through a series of forms displayed by a browser in the client computer. After making desired changes to the site, the user may publish it as a new Web site in case of creating or as a new version of a Web site in case of editing a site. The original templates and their databases are preserved at all times.

A user selects a style template upon which his or her Web site will be based on. In the present embodiment, when a user selects a template to create a site, the template is duplicated in the server computer. All changes to the copy of the template occur on the server computer. When the template is published as a Web site, the database is used to generate a set of Web pages that make up the new site.

Figure 5:
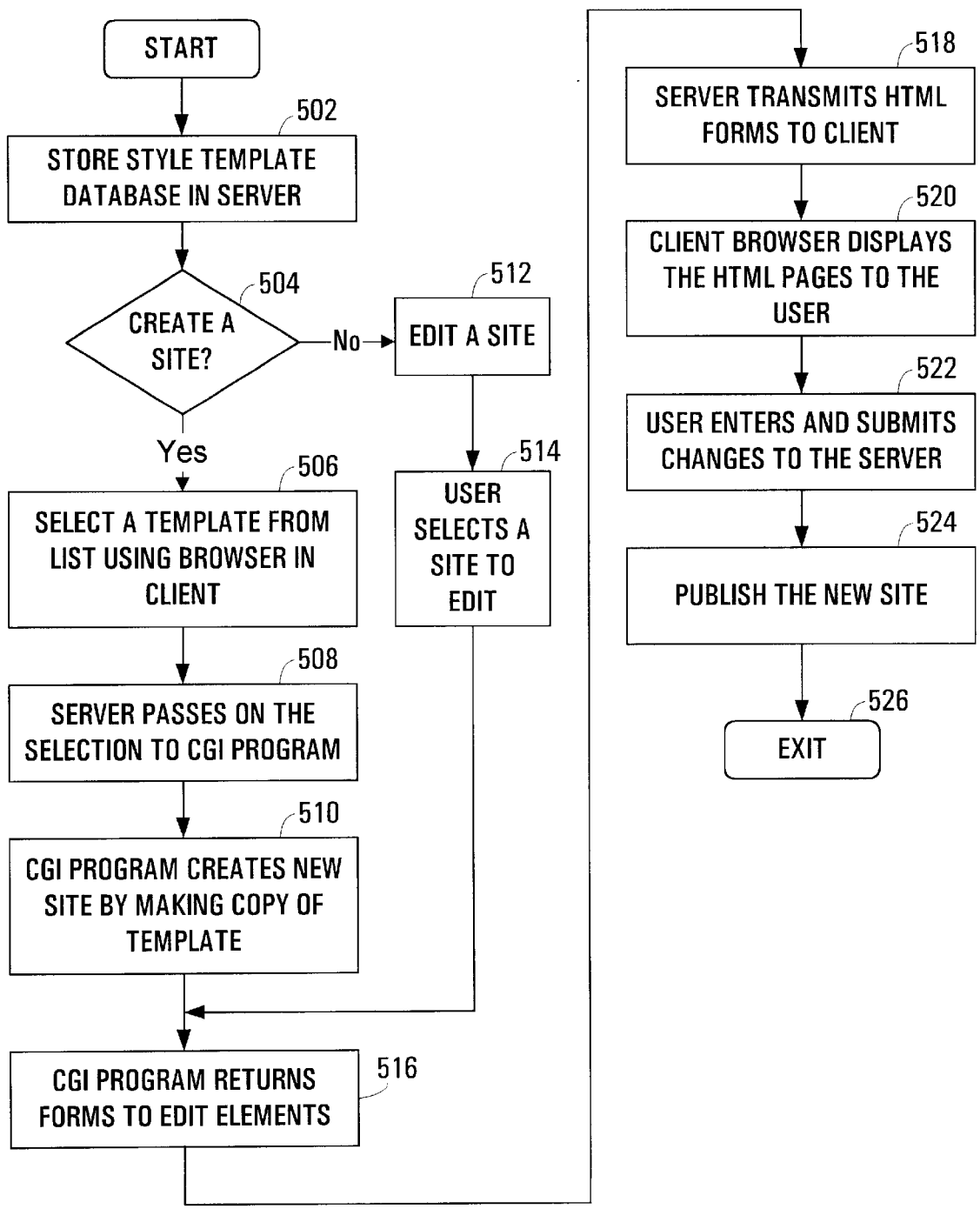
FIG. 5 illustrates a flow diagram of major steps taken in creating a Web site or editing a site based on style templates according to the present embodiment.

FIG. 5 illustrates a flow diagram of major steps taken in creating a Web site or editing a site based on style templates according to the present embodiment. At step 502, style templates are stored in the server computer as database files and consist of a set of objects or elements stored in the database. If a user wishes to create a site at step 504, he or she selects a template for creating or editing a Web site at step 506. Then at step 508, the server passes on the user's template selection to a CGI program. The CGI program, at step 510, then creates a new but unpublished site by making a copy of the selected template using the template database. If instead, a user wishes merely to edit a site as in step 512, then the user selects a site to edit as in step 514.

In either case of creating or editing a site, the CGI program returns HTML forms to the server that allow the user to customize site as in step 516. At step 518, the server transmits the HTML forms to the client computer. Then, at step 520, a browser program in the client computer displays the HTML pages to the user. At step 522, the user enters and submits changes to the server, which involves selecting elements to change and submitting the forms. In this step, the user customization is carried out by editing one or more database elements and associated attributes of the working database copy that now makes up the site. The original databases remain intact to be used again in creating new sites. It goes without saying that the server receives the user submission at step 522 and passes on the request to the CGI program. Publishing, at step 524, allows the CGI program to generate a directory and associated files for the Web site and store them in a storage unit in the server so that the site can be accessed in the future as a fully working and updated site. This process then terminates at step 526.

Each of the elements and associated properties within a template database are editable (i.e., customizable) by a user.

Figure 6:
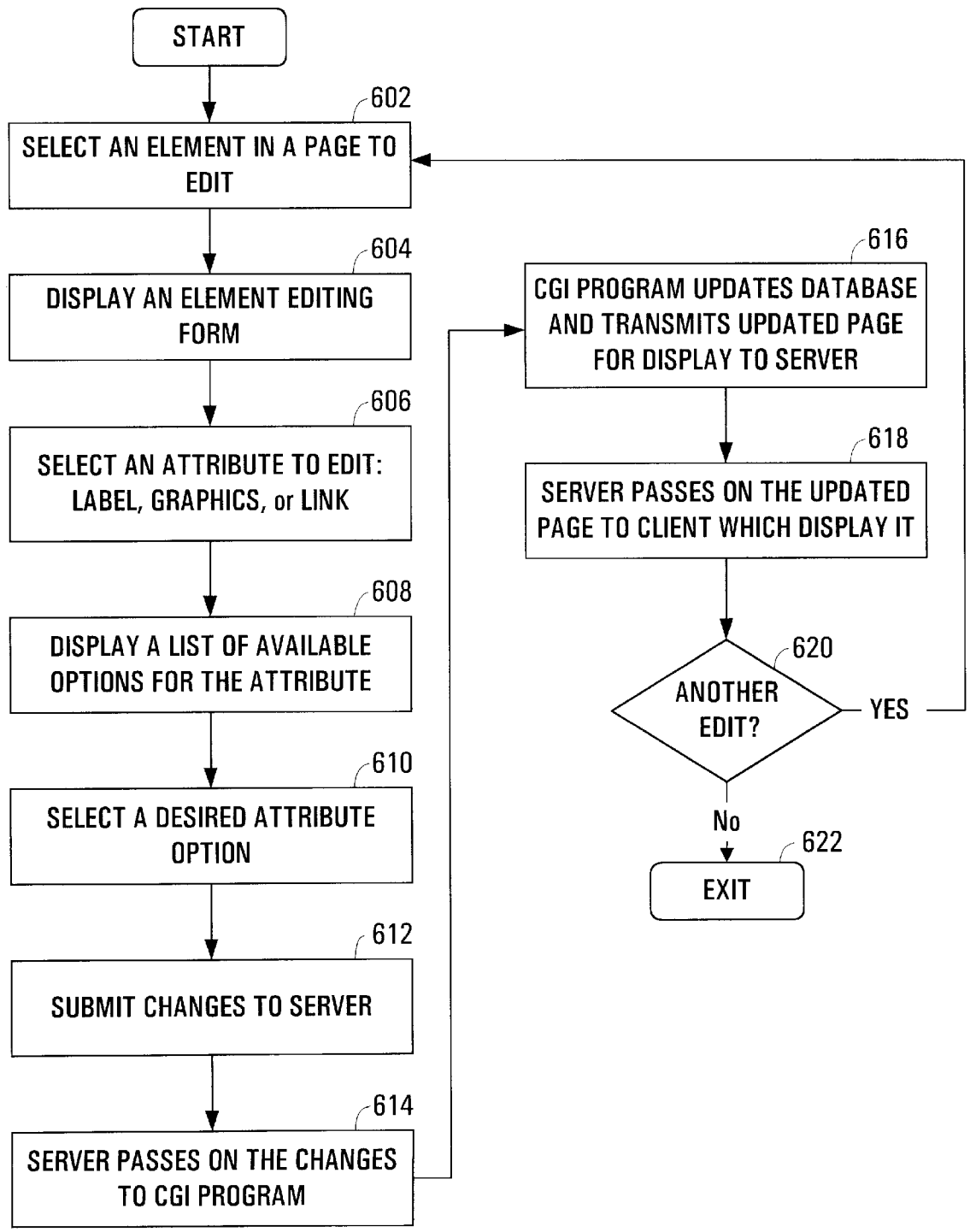
FIG. 6 illustrates a flow diagram of basic steps involved in editing an element and its attributes in a page of a site.

FIG. 6 illustrates a flow diagram of basic steps involved in editing an exemplary element and its attributes in a template or a page in a site. In step 602, the user first selects an element to edit. In response, the server passes on an element editing form to the client which displays it for the user at step 604. At step 606, the user then selects one of the element attributes to edit: label, graphics, or link. The server passes on an option list for the chosen attribute to the client. The client displays the option list at step 608. At step 610, the user selects a desired option and types in a specified attribute if necessary. Then at step 612, the user submits the changes to the server. At step 614, the server passes on the changes and associated data to a CGI program. The CGI program, at step 616, processes the data, updates the database, generates an updated page, and transmits the updated page to the server. At step 618, the server passes on the updated page to client which displays the newly updated page for the user. If the user wishes to make another modification as in step 620, the user proceeds to select another element as in step 602. Otherwise, the process terminates at step 622.

In the present embodiment, the user may customize or edit attributes of an element such as label, graphics, and link. To edit an element, user first selects the element. The server receives the request to edit and passes it to a CGI program. The CGI program processes the request and associated data, generates a element editing form and returns it to the server. The server returns the form to the client which displays it to the user. The user then selects an attribute to edit, such as label, graphics, or link. The user's selection is again forwarded to the server which passes it to the a CGI program. The CGI program processes the selection and associated data, generates a set (i.e., list) of available options for the selected attribute and passes the set on to the server. The server then transmits the set of options to the client which displays it to the user.

The user then selects one of the options from the set of available options and makes the desired modifications by further selection of choices presented or by typing in a desired text in provided text entry fields if necessary. Then, the user submits the changes to the server. In response, the CGI program in the server updates the changes in the database and a newly customized Web page is displayed on the client computer.

After editing the site, the existing published site database or the new site database are published to replace the existing database. In case of new Web site creation, after customizing, the user names the Web site and submits a request to publish the site. Up to this point, the Web site has existed as a database structure within the server. When CGI program publishes the site, it generates a directory in the server and creates associated files (e.g., HTML, image, elements, and etc.) in the directory. Now the Web site officially comes into existence and it can be accessed through the Web or intranet. According to the present embodiment, when a site is published, two types of HTML files are generated. A CGI program generates both a graphics intensive (rich) and text-only (lite) versions of the site. The CGI program generates the text only version by incorporating only the text elements and attributes from a database file. A user or a site visitor may choose to view either version.

In the present embodiment, publishing also triggers an indexer program which automatically indexes the content of the published site in a sorted order by keywords. The indexer enables a user to search the entire web site and is comprised of a database which includes keywords and their locations within the site. The present invention uses this indexing feature to enable a user to enter a search query to easily find specific information in the web site. Hence, the automatic indexing allows almost instantaneous access to all the information within the site.

In addition, the present embodiment allows automatic display of present day and date to a Web page as an image file. Whenever a page is displayed, a CGI program incorporates the day and date image into a page to be displayed and passes on the page to the server. The server then transmits the page to the client which displays the page with the current day and date image.

The present embodiment allows not only authoring from the server, but also authoring from a client computer. Unlike conventional Web site authoring methods which typically require a user to create and edit a Web site at the server computer, the present embodiment enables a user to create and edit a Web site on a server from a client computer. According to the present embodiment, a Web site is classified as public or private access. Public access allows anyone with access to the site to edit the site while private access only allows the site owner to edit the site. Hence, the site owner may edit his or her Web site from a client computer. Similarly, any user may edit a public site from a client computer. Thus, a user with appropriate access may create and edit a site on a server from a distant client computer.

The present embodiment of the invention also allows adding new pages by linking them to a page within a Web site. A new page may be created by copying from an existing page template or by copying from an existing page. The user selects a template from a list of existing page templates provided such as a free form page, blank page, a search page, or a URL list, and etc. In the alternative, the user may use an existing page and make a copy of it. The present embodiment also allows importing an HTML file to create a new page. A user imports a page by submitting a path and name of the page's HTML file. In all three cases, the user then names or renames the new page. Then, the user submits the change to the server. The server receives the new page and updates the site by automatically adding a link to the new page from the selected element in the page that was being edited.

The present embodiment also allows a full-text search page to be added to a Web site. To add a search page to a site, a user first selects an element in a page or site to link to a search page. The server then generates a list of search page templates which are passed on to the client for display. Then, the user selects a search page from the list of templates and customizes the search page. The search page is accessible through a hypertextually linked element in the site or the page. When the site is published with this page added, the server automatically creates a searchable index for all pages in the site.

USER'S PERSPECTIVE

Figure 7:
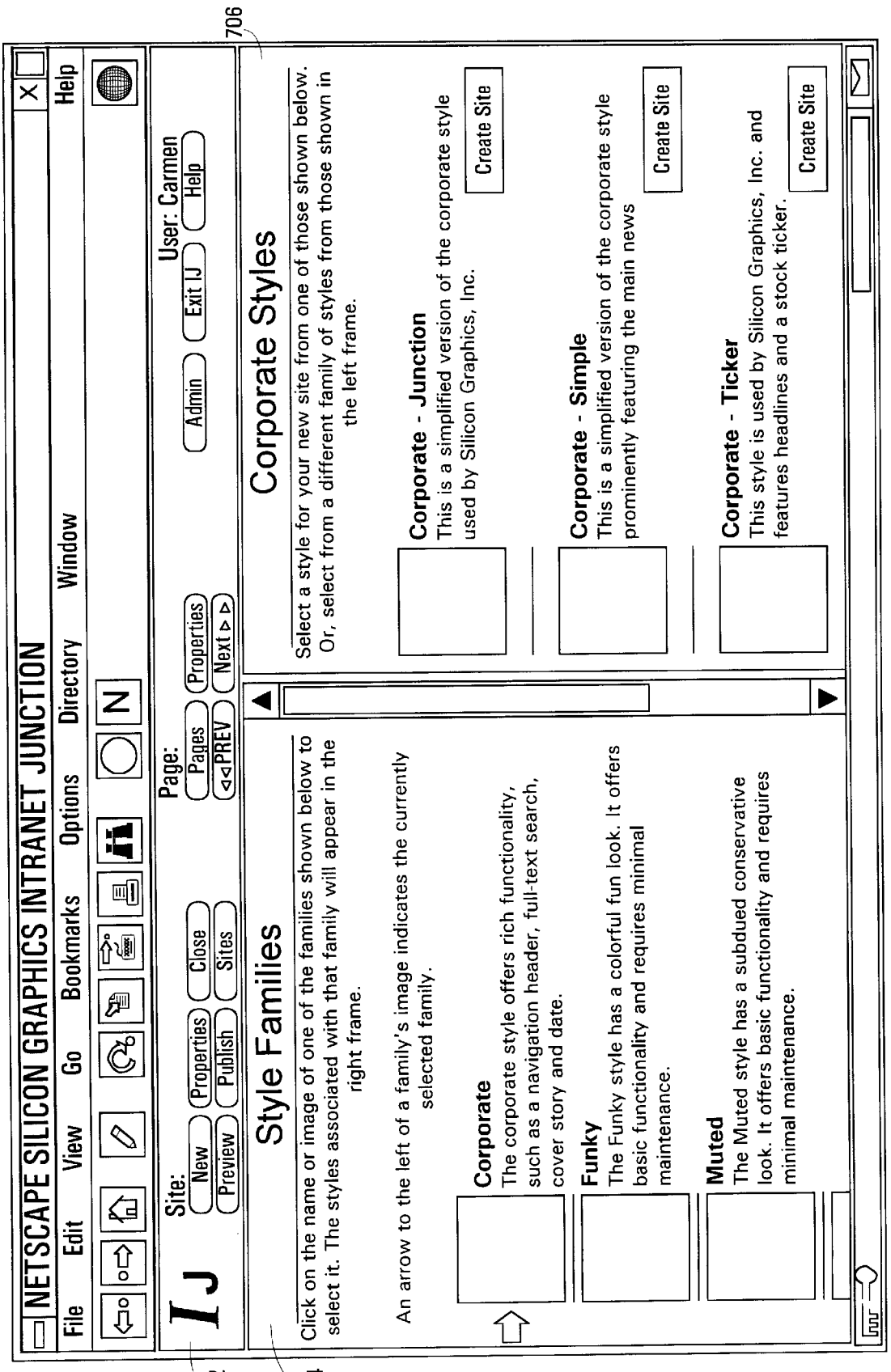
FIG. 7 illustrates a user's perspective of a sample initial display screen for creating and editing a new Web site according to the present embodiment.

The ease and efficiency of the present invention in creating and editing a Web site from a user's perspective are illustrated in the FIGS. 7 through 13. FIG. 7 illustrates a user's snapshot perspective of a sample initial display screen for creating and editing a new Web site according to the present embodiment. The screen 700 of the present embodiment consists of a top frame 702, a left-hand frame 704, and a right-hand frame 706. Top frame 702 contains the menu bar which is used to navigate between pages and to access site and page creation and maintenance features. Left-hand frame 704 is used to display pages of the site while editing while right-hand frame 706 is used to display the editing and site maintenance tools and forms.

With reference to FIG. 7, the menu bar is divided into three parts: site, page, and other buttons. The six Site buttons are used to perform the following functions:

New: To display a list of templates from which to select and create a new site.

Sites: To access the list of published and unpublished sites; to open, delete, and copy sites; and to view the owner and status of a site.

Properties: To view or change a site's name, description, and whether a site is marked public or private. (Private means only the site owner has authority to edit the site; public means the owner and others have permission to edit the site.)

Close: To close a site, thereby unlocking it so that others have the ability to edit.

Preview: To publish the site to a hidden directory so that only the user can view it before publishing the site.

Publish: To generate HTML files and copy the site to a specified directory.

The four Page buttons are used in the following manner:

Pages: To display a list of pages within a site; to create, import, delete, and copy pages.

Properties: To view or change a page's name, description, and HTML filename.

Prev: To go to the previous page in the left-hand frame.

Next: To go to the next page in the left-hand frame.

The remaining three buttons are used for the following:

Admin: To access the administration tools; to add or delete users, change passwords, delete sites, delete locks.

Help: To get help on the present program.

Exit IJ: To end the current user session and exit the present program

In reference to FIG. 7, the present embodiment creates a new Web site by first clicking on the New button in the menu bar. Screen 700 displays the list of style families in left-hand frame 704. The user then clicks, for example, Corporate template or the corresponding thumbnail image in left-hand frame 704 to display the Corporate styles in the right-hand frame 706. User then clicks the Create Site button next to the selected "Corporate-Junction" style.

Figure 8:
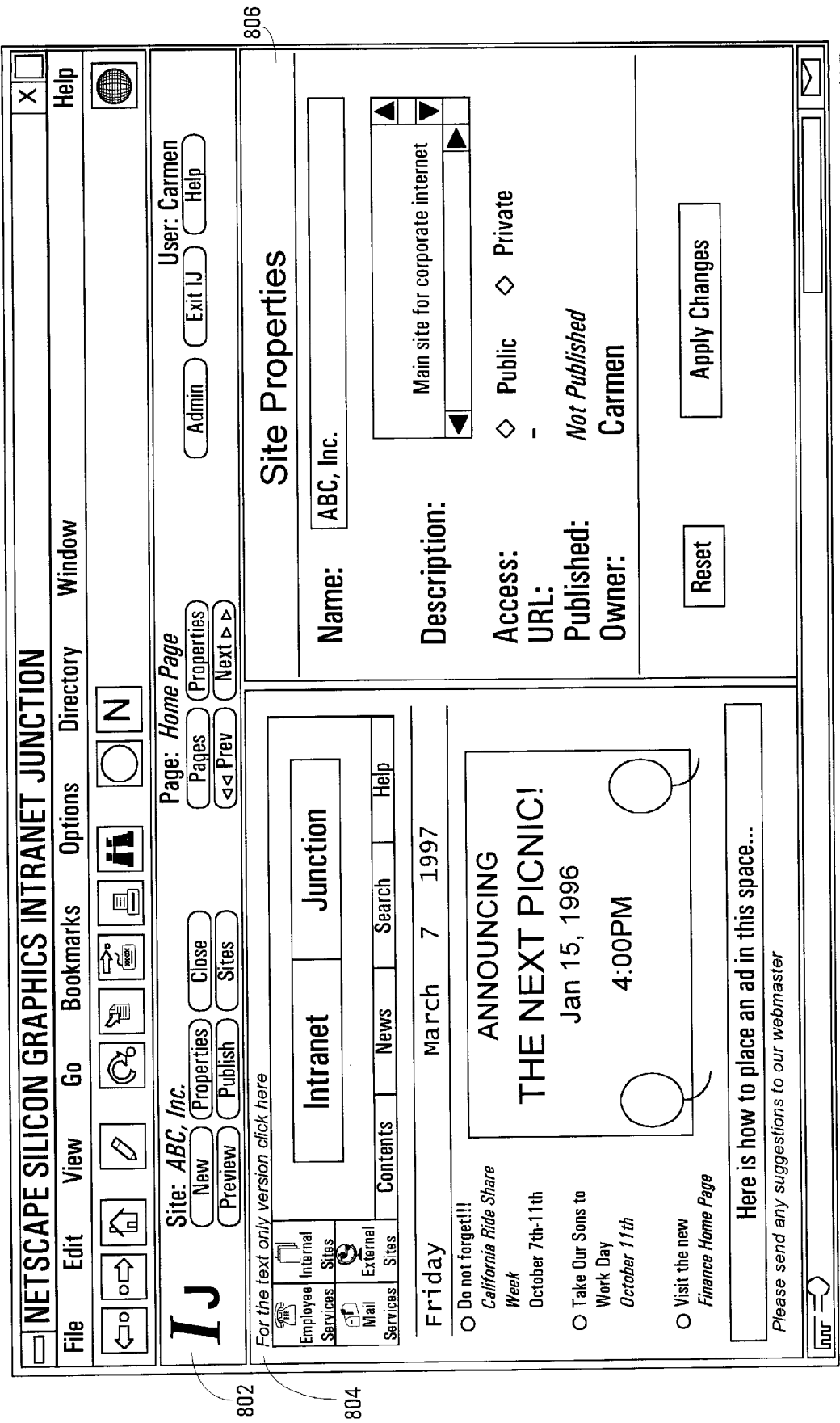
FIG. 8 illustrates a user's perspective of a display screen after selecting a style template to create a new Web site in FIG. 7.

FIG. 8 illustrates a user's perspective of a display screen after selecting a style template to create a new Web site in FIG. 7. The home page of the selected Corporate template appears in the left-hand frame 804 and the Site Properties page appears in the right-hand frame 806. User then names the site and gives a description of the site in the text entry blocks provided as shown in the right-hand frame 806. Then, the user clicks on the radio button next to "public" to allow public access to the Web site in the right-hand frame 806. The user then clicks the "Apply Changes" button.

Figure 9:
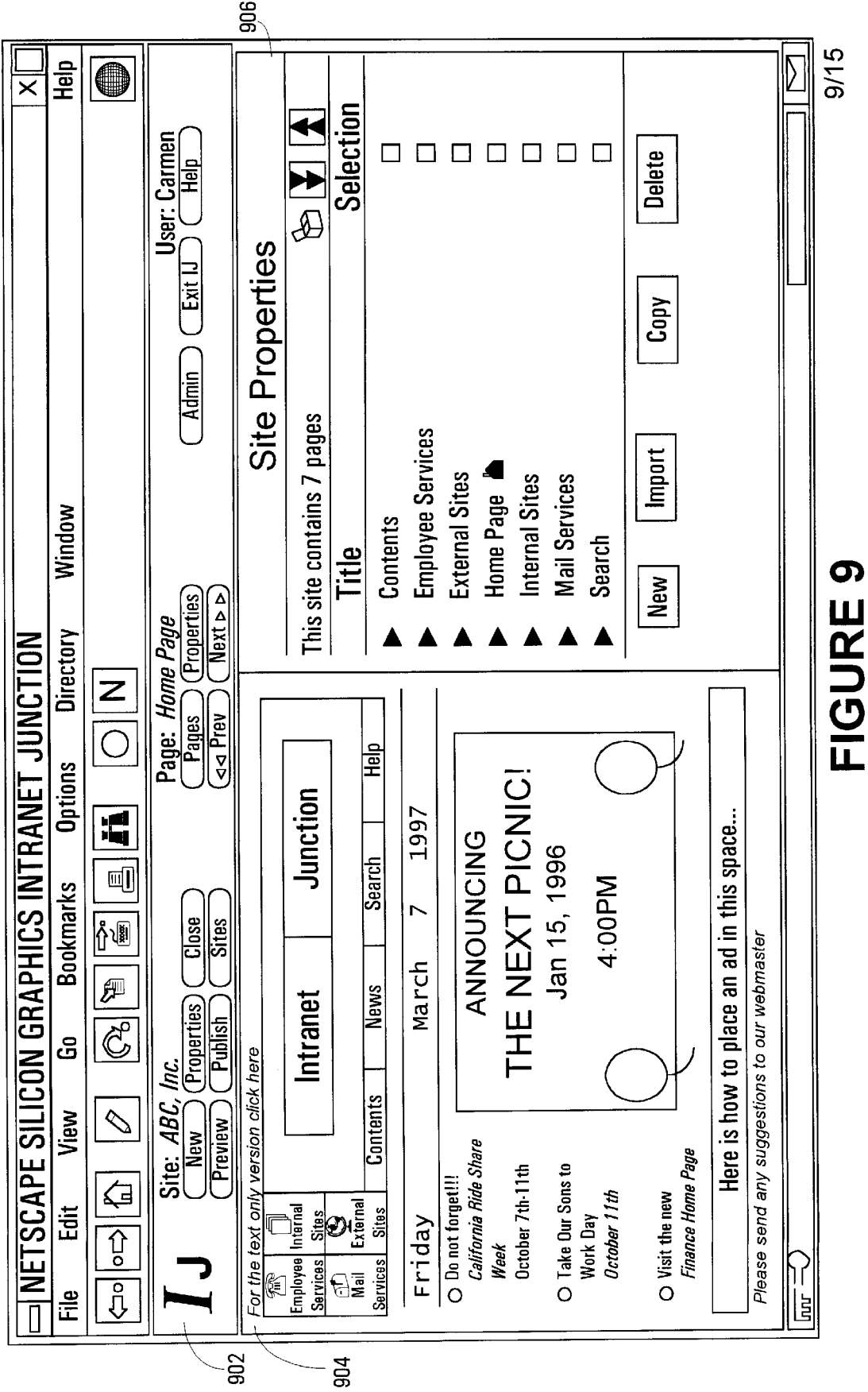
FIG. 9 illustrates another perspective of the user's display screen depicting pages in a site.

FIG. 9 illustrates another perspective of the user's display screen depicting pages in the site. The left-hand frame 904 shows the home page of the selected Corporate style template. The right-hand frame 906 shows all pages in the site. These exemplary pages are automatically generated upon selecting a style template.

Figure 10:
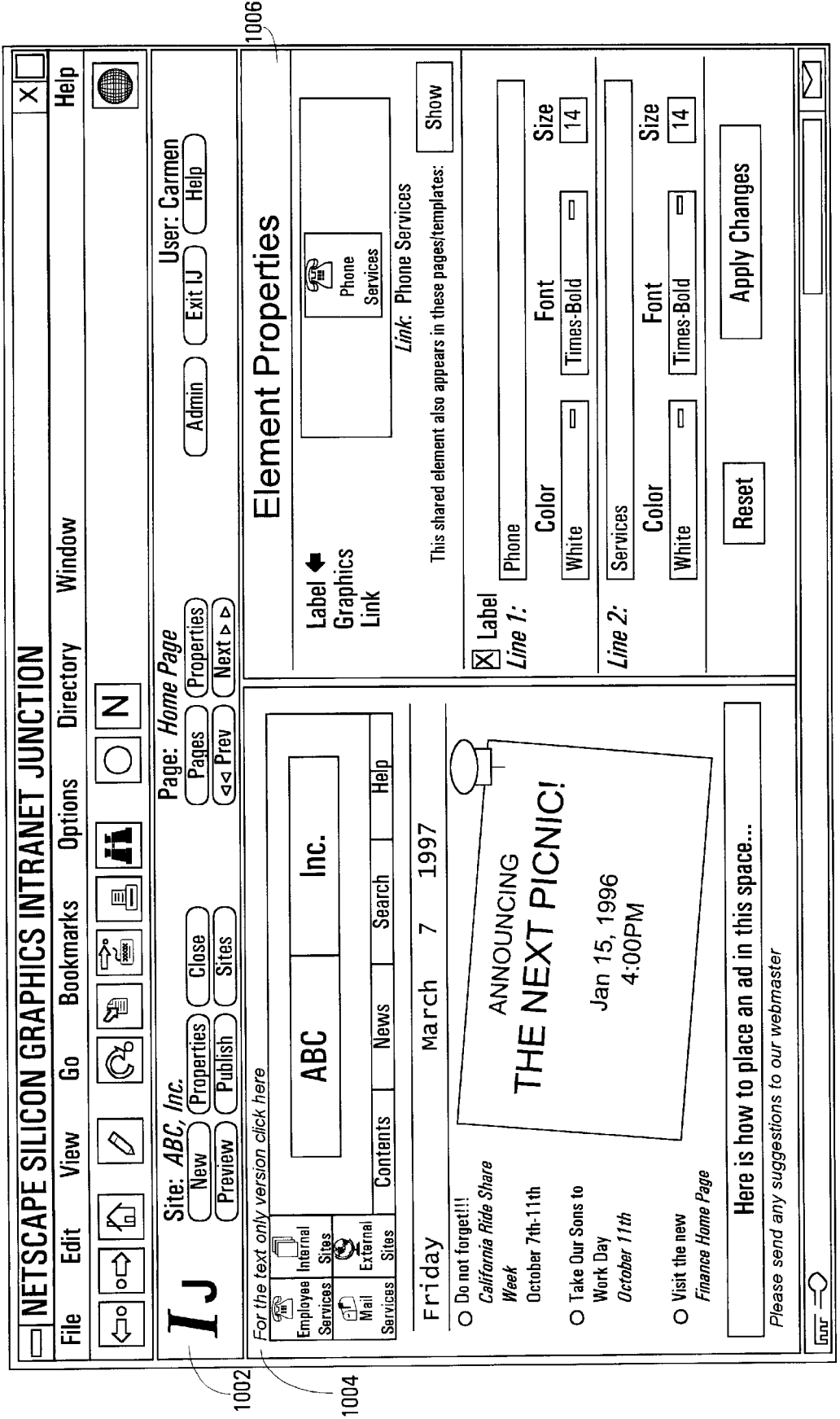
FIG. 10 illustrates a further perspective of the user's display screen for changing the text attributes of an exemplary button, "Phone Services," in left-hand frame.

FIG. 10 illustrates a further perspective of the user's display screen for changing the text attributes of an exemplary button, "Phone Services," in the left-hand frame. The left-hand frame 1004 shows the updated Web site with a new name. The buttons, graphics, and text in left-hand frame 1004 are elements comprising a template database. Each of these elements and their associated properties are customizable by the user. In the present exemplary embodiment, the user selects the "Phone Services" button (i.e., icon) in left-hand frame 1004 to customize its text label. This immediately brings up the right-hand frame 1006 depicting an "Element Properties" screen. The user clicks on the text link "Label" to customize the label attribute of the "Phone Services" button. Right-hand screen 1006 then displays text entry blocks for entering text labels. The screen also allows the user to change other attributes of text such as color, font, and size of text.

Figure 11:
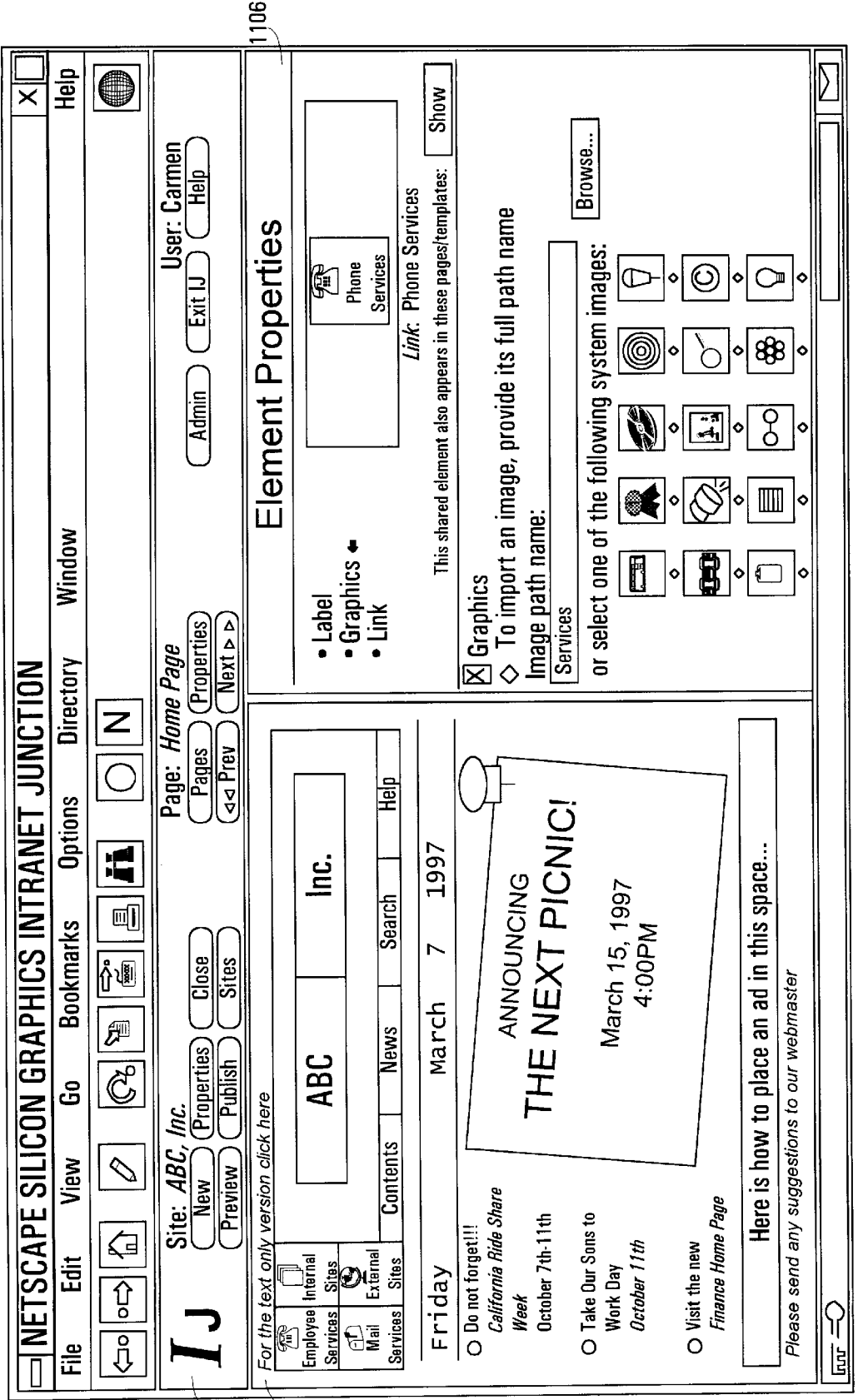
FIG. 11 illustrates a further perspective for changing a graphics attribute of an exemplary button, "Phone Services," in left-hand frame.

FIG. 11 illustrates a further perspective for changing a graphics attribute of an exemplary button, "Phone Services," in the left-hand frame 1104. The user first clicks on the "Phone Services" icon in left-hand frame, which brings up the "Element Properties" screen on the right-hand frame 1106. Then the user clicks on the "Graphics" link to edit the graphics associated with the icon. The lower portion of right-hand frame 1106 displays two choices for the user: import an image by typing or browsing for its full path name, or select from available graphics images. The user makes a desired selection and then clicks on "Apply Changes" button (not shown) to update the graphics image of the selected element.

Figure 12:
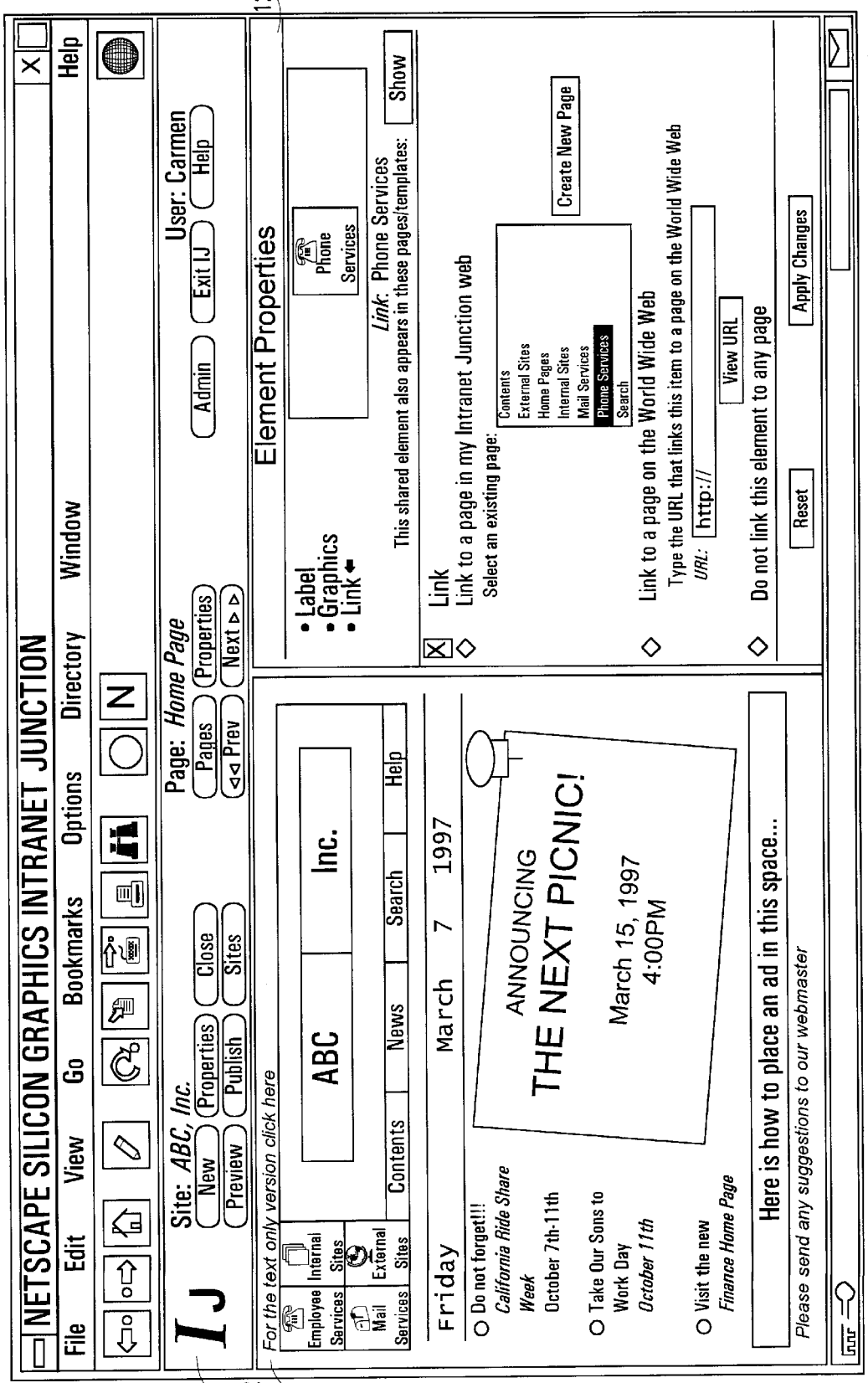
FIG. 12 illustrates another perspective for creating a link attribute for the button element, "Phone Services," in left-hand frame.

FIG. 12 illustrates another perspective for creating a link attribute for the button element, "Phone Services," in the left-hand frame 1204. The user first clicks on the "Phone Services" button in the left-hand frame 1204. An "Element Properties" window immediately appears in the right-hand frame 1206. The user then clicks on the "Link" label in the top portion of right-hand frame 1206. The lower portion of right-hand frame 1206 allows the user to link to a page in the Web site by clicking on a page name or to a page in the World Wide Web by entering its URL. If instead, the user wishes to create a new page to link to, then the user clicks on "Create New Page" text button. The user then clicks on "Apply Changes" button to update the new link of the element.

In the present embodiment, a Web site is published to generate associated files for storage and thus enable future access to the updated site. Publishing a Web site involves creating a directory on a server and generating associated files (e.g., HTML, image, elements, and etc.) in the directory. After publishing, all changes are updated and the updated site can be accessed through the Web or intranet.

Figure 13:
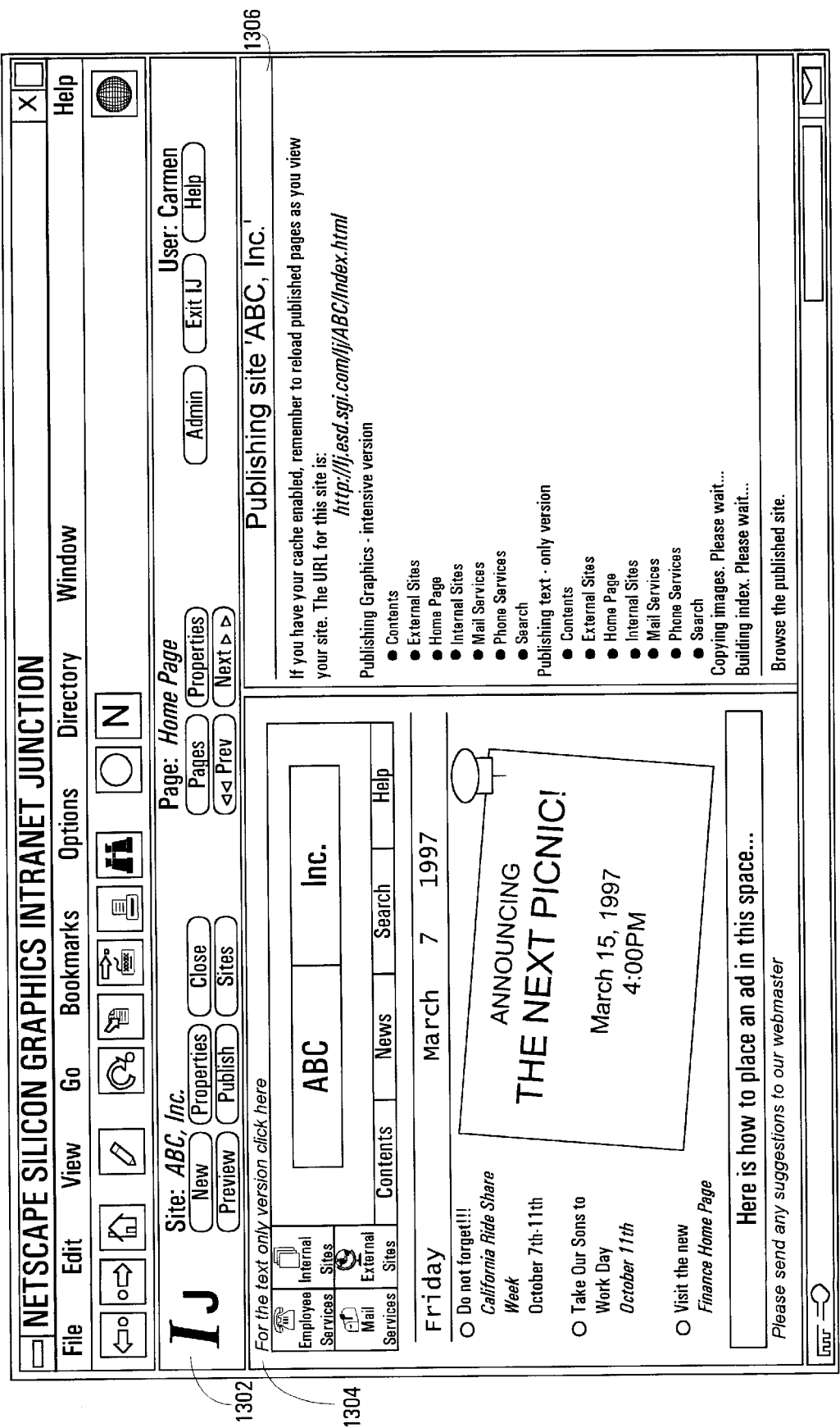
FIG. 13 illustrates an exemplary snapshot of a Web site being published in the present embodiment.

FIG. 13 illustrates an exemplary snapshot of a Web site being published in the present embodiment. The left-hand frame 1304 displays a working Web site being published. The right-hand frame 1306 displays a screen of publishing information for the Web site being published. Right-hand frame 1306 also shows the URL of the site. In addition, it shows that both graphics and text versions of the site are generated.

Figure 14:
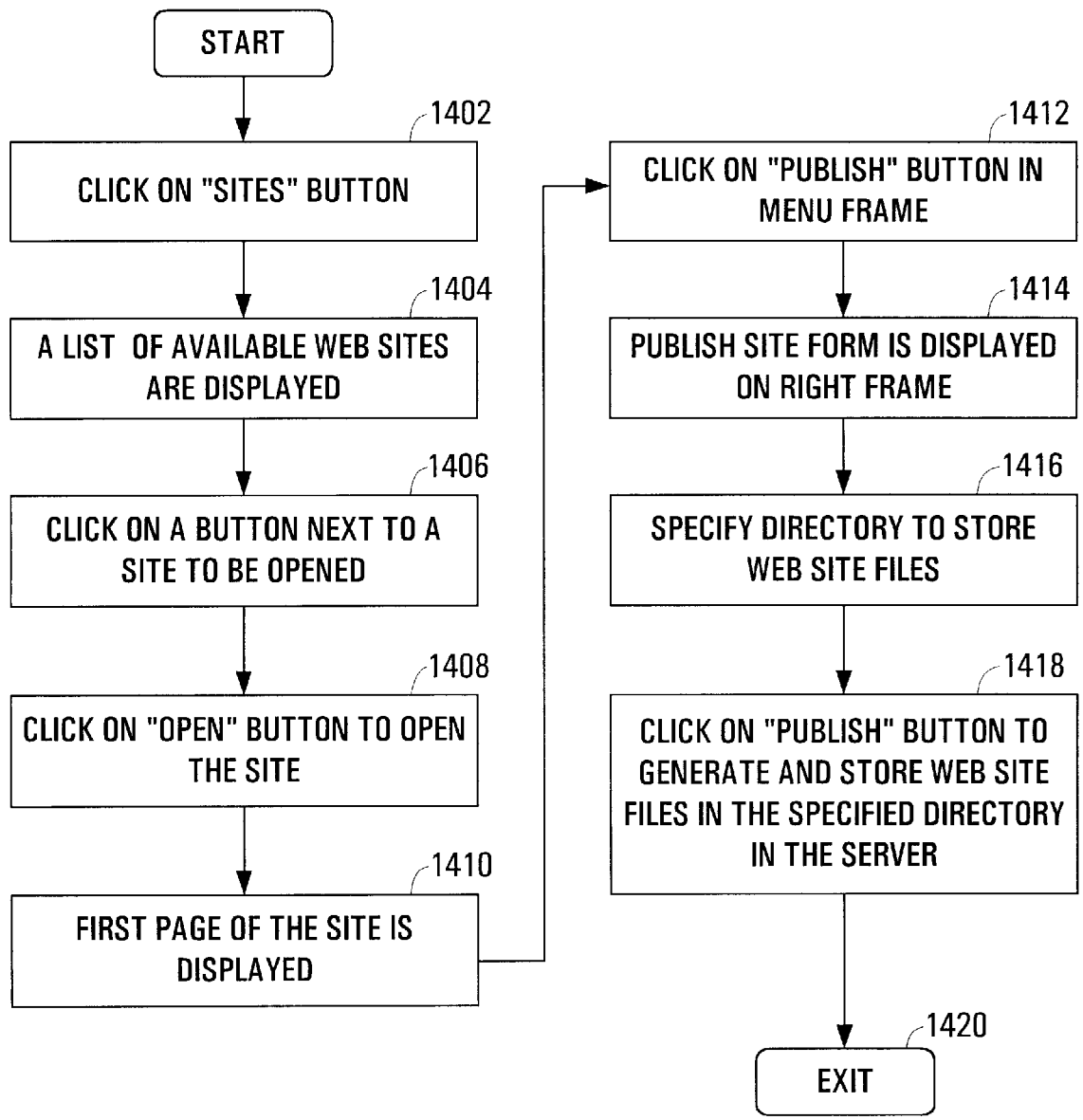
FIG. 14 illustrates an exemplary series of user actions in publishing a site.

FIG. 14 illustrates a series of user actions in publishing a site. At step 1402, the user clicks on the "Sites" button in the menu bar on the top frame. Then at step 1404, a list of sites is then displayed to the user. At step 1406, the user clicks the radio button to select the site to be published. At step 1408, the user then clicks the "Open" button to open the site. The steps up to this point were carried out to open a site to be published. If a site is already open, the user skips these steps entirely and proceeds directly to the following steps. At step 1410, the first or a page of the site appears in the left-hand frame. At step 1412, the user clicks the "Publish" button in the menu bar on the top frame. The Publish site form appears on the screen at step 1414. Then the user, at step 1416, specifies a directory name for the site. The user may type in a desired directory name for the site; otherwise a default directory using the first word of the site name is assigned. At step 1418, the user clicks the "Publish" button to publish the site. The Web site files are generated and stored in the specified directory. The process then terminates at step 1420.

Figure 15:
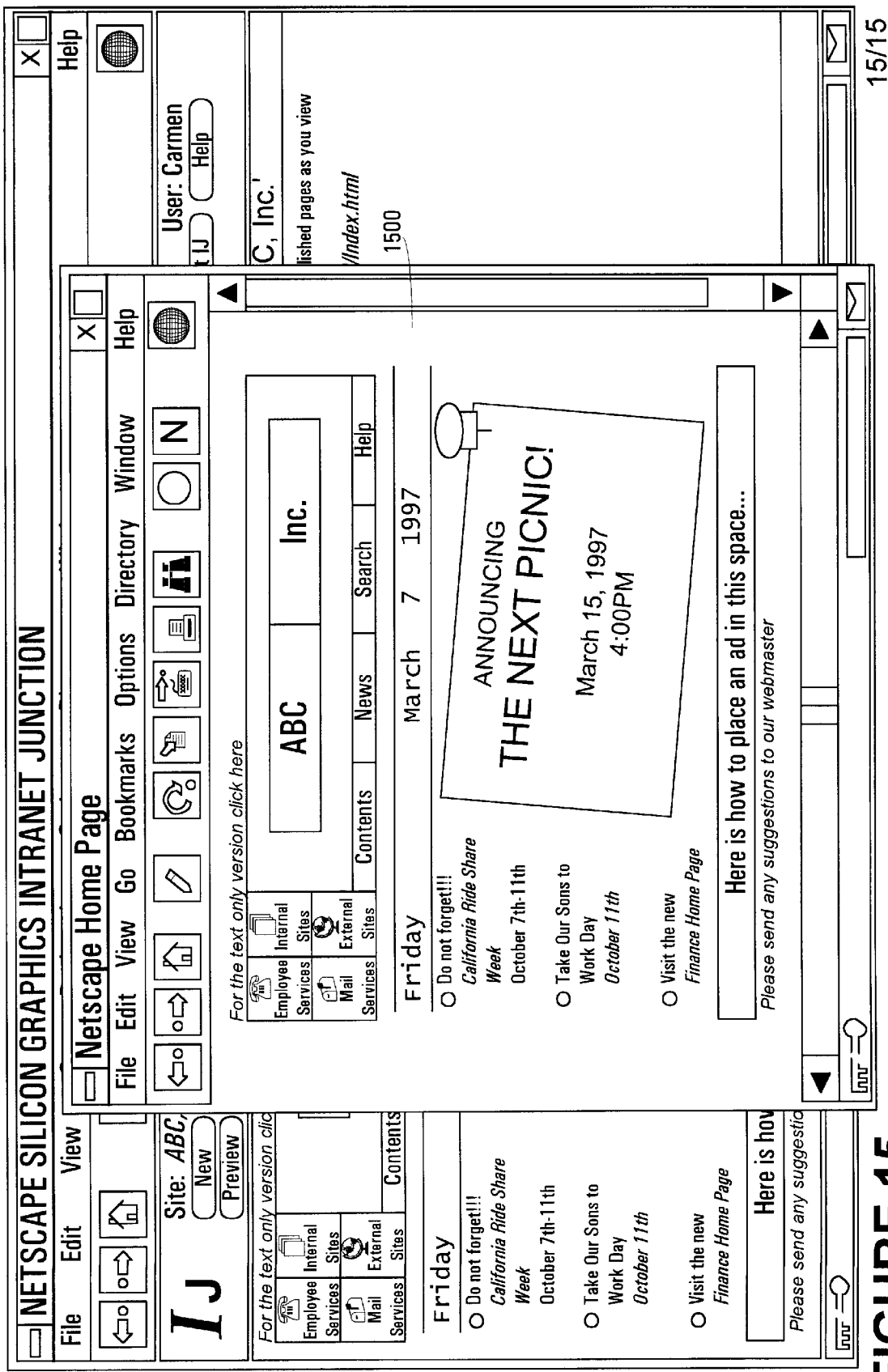
FIG. 15 illustrates an exemplary home page of a Web site created according to the present embodiment of the present invention.

FIG. 15 illustrates an exemplary Web site 1500 created according to the present embodiment of the present invention. The Web site is viewed by a Netscape™ Navigator browser program. Web site 1500 shows that the site is for "ABC Inc." which has been customized into the site. Web site 1500 shows other buttons, text fields, and graphics that can be edited and customized according to the user's choosing.

According to the present embodiment, managing sites and pages are easily carried out by selecting the corresponding buttons in the menu bar on the top frame. Managing a site involves the following actions: editing a site, copying a site, deleting a site, renaming a site, locking and unlocking a public access site, and changing the site owner. To manage a site, the user initially clicks the Sites button in the menu bar, which brings up a list of sites in the right-hand frame. For editing, the user edits a site according to the method discussed at length above. To copy a site, the user clicks on a button next to the name of the site to be copied and then clicks the Copy button. For deleting a site, the user may click on a button next to the name of the site to be deleted. The user is displayed a screen giving a choice of deleting the database or the database and published site. The user clicks on one and then clicks the Delete button in the screen. To move a site, user copies the complete directory and files of the site to a new location. For renaming a site, the user clicks a button next the name to be renamed and then types in a new name in a form displayed. To lock a public access site, the user merely opens a site by clicking on a button next to the name of the site to be opened and then clicks the "Open" button. This prevents others from editing the same site at the same time if the site is public access site. For unlocking a site, the user gives up the lock by clicking on the "Close" button on the menu bar to close the site, or by opening another site, or by remaining inactive for 30 minutes or more.

The present embodiment also allows changing of site owner. By default, the creator of a site is also the owner of the site. To change the site owner, the user logs in as the administrator by clicking on the Admin button on the menu bar in the top frame. The Admin login screen appears. The user types in an admin password and then clicks on the button "Sites." The Site administration form appears. The user clicks on the button next to the site to be changed and then clicks the "Change Properties" button. The user then types in the name of the new owner and clicks the "Apply Changes" button.

To manage existing pages, the user initially clicks the "Pages" button in the menu bar, which brings up a list of pages in the right-hand frame. For adding a page, the user creates a page according to the method discussed at length above. For copying a page, the user clicks on a button next to the name of the page to be copied and then clicks the "Copy" button. To delete a page, the user clicks on a button next to the name of the page to be deleted. For renaming a page, the user clicks the "Page Properties" button in the menu bar and then types in a new name in a form displayed.

As demonstrated above, the present invention provides and utilizes templates for creating and editing a Web site. The template based method of creating a Web site in the present embodiment is easy and efficient for novices and busy professionals alike. In the present invention, the layout of Web sites has been pre-designed for the users. Knowledge of HTML is not necessary to create a professional looking Web site. Most of the steps are carried out by clicking on buttons, graphics, or text labels. The present invention requires a user to type in information only when absolutely necessary for providing unique information such as names, labels, or file and directory names. Thus, the present invention enables a user to create an entire Web site infrastructure easily and efficiently. Although the present embodiment describes a method for creating and editing a Web site for a typical user at a client computer, it should be borne in mind that the present invention is equally suitable to a user creating and editing a Web site from a server computer.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for creating and editing a Web site in a client-server computer network, the method comprising the steps of:

storing a plurality of Web site templates in a storage device coupled to the client-server computer network, wherein each of the Web site templates is for building an entire new Web site, wherein each of the Web site templates comprises a plurality of interlinking Web pages, and wherein each of the Web site templates comprises a plurality of customizable elements;

generating a request to create a Web site from a client computer to a server computer;

transmitting a list of available Web site templates from the server to the client for display;

selecting a Web site template from the list of Web site templates;

generating a copy of the selected Web site template;

customizing the copy of the selected Web site template;

publishing the customized copy of the selected Web site template as a new Web site, wherein the new Web site has same Web site structure as the selected Web site template's Web site structure;

locking automatically said Web site from access by a different user such that said different user is prevented from editing said Web site at the same time as a current user; and unlocking automatically said published Web site when said current user terminates editing said Web site such that said different user can edit said Web site.

2. A method as recited in claim 1, wherein said publishing step comprises the steps of:

generating a request to publish the Web site from a client to a server; and in response, the server generating a plurality of files comprising the Web site and storing the files in a directory.

3. A method as recited in claim 1, wherein said elements are a plurality of buttons and text labels.

4. A method as recited in claim 3, wherein said elements are defined by a plurality of attributes.

5. A method as recited in claim 4, wherein said attributes are a graphic, a label, and a link.

6. A method as recited in claim 5, wherein said customizing step comprises the steps of:

receiving, by a server, a request to customize an element in the copy of the Web site template;

in response to the request, the server generating and transmitting, to the client for display, an element editing form for editing the attributes; and in response to the previous step, the client selecting and transmitting to the server a desired attribute.

7. A method as recited in claim 2, wherein the Web site files include both a graphics version and a text only version such that a Web site is capable of being displayed in either a full graphics site or a full text site.

8. A method as recited in claim 1, wherein the Web site is indexed for key words immediately after publishing said created Web site, wherein a search page of said Web site is used to search said indexed keywords for an entire Web site search request.

9. A method as recited in claim 1, wherein the Web site template includes a present date element such that a present day and date is displayed on the Web site as an image file.

10. A method for editing a Web site in a client-server computer network, the method comprising the steps of:

displaying a list of published and unpublished Web sites;

generating a request to edit a Web site from a client to a server, wherein said Web site is selected from said list of Web sites;

locking automatically said Web site from access by a different user such that said different user is prevented from editing said Web site at the same time as a current user;

transmitting the Web site from the server to the client for display wherein the Web site is comprised of a plurality of elements;

selecting an element;

customizing the selected element;

publishing the Web site with the customized element; and unlocking automatically said published Web site when said current user terminates editing said Web site such that said different user can edit said Web site.

11. A method as recited in claim 10, wherein said publishing step comprises the steps of:

generating a request to publish the Web site with the customized element from a client to a server; and in response, the server generating a plurality of files comprising the Web site and storing the files in a directory.

12. A method as recited in claim 10, wherein said elements are a plurality of buttons and text labels.

13. A method as recited in claim 12, wherein said elements are defined by a plurality of attributes.

14. A method as recited in claim 13, wherein said attributes are a graphic, a label, and a link.

15. A method as recited in claim 14, wherein said customizing step comprises the steps of:

receiving, by a server, a request to customize an element in the copy of the Web site template;

in response to the request, the server generating and transmitting, to the client for display, an element editing form for editing the attributes; and in response to the previous step, the client selecting and transmitting to the server a desired attribute.

16. A method as recited in claim 11, wherein the Web site files include both a graphics version and a text only version such that a Web site is capable of being displayed in either a full graphics site or a full text site.

17. A method as recited in claim 10, wherein the Web site is indexed for key words immediately after publishing said edited Web site, wherein a search page of said Web site is used to search said indexed keywords for an entire Web site search request.

18. A method as recited in claim 10, wherein the Web site template includes a present date element such that a present day and date is displayed on the Web site as an image file.

* * * * *